United States Patent
Ono

(10) Patent No.: US 9,996,372 B2
(45) Date of Patent: Jun. 12, 2018

(54) INFORMATION PROCESSING APPARATUS, INFORMATION PROCESSING SYSTEM AND PROGRAM

(71) Applicant: FUJITSU LIMITED, Kawasaki-shi, Kanagawa (JP)

(72) Inventor: Katsuhiko Ono, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 216 days.

(21) Appl. No.: 15/055,671

(22) Filed: Feb. 29, 2016

(65) Prior Publication Data

US 2016/0283280 A1    Sep. 29, 2016

(30) Foreign Application Priority Data

Mar. 27, 2015   (JP) ................... 2015-066310

(51) Int. Cl.
| | | |
|---|---|---|
| *G06F 9/46* | (2006.01) | |
| *G06F 9/455* | (2018.01) | |
| *G06F 11/30* | (2006.01) | |
| *G06F 9/50* | (2006.01) | |

(52) U.S. Cl.
CPC ........ *G06F 9/45533* (2013.01); *G06F 9/5077* (2013.01); *G06F 11/30* (2013.01); *G06F 2209/508* (2013.01)

(58) Field of Classification Search
None
See application file for complete search history.

(56) References Cited

U.S. PATENT DOCUMENTS

| | | | |
|---|---|---|---|
| 2004/0054566 A1* | 3/2004 | J'Maev | ............ G06Q 10/06313 705/7.23 |
| 2004/0223176 A1* | 11/2004 | Ueda | ....................... G06F 9/485 358/1.13 |
| 2005/0055351 A1* | 3/2005 | Barton | .............. G06F 17/30345 |
| 2005/0198576 A1 | 9/2005 | Childress et al. | |
| 2005/0268303 A1* | 12/2005 | Anderson | ............ G06F 9/4825 718/102 |
| 2006/0168584 A1* | 7/2006 | Dawson | ................ G06F 9/5072 718/104 |
| 2008/0030764 A1* | 2/2008 | Zhu | ....................... G06F 9/5038 358/1.15 |

(Continued)

FOREIGN PATENT DOCUMENTS

| | | |
|---|---|---|
| JP | 07-302242 | 11/1995 |
| JP | 2004-021549 | 1/2004 |

(Continued)

*Primary Examiner* — Hiren Patel
(74) *Attorney, Agent, or Firm* — Fujitsu Patent Center

(57) ABSTRACT

An information processing apparatus includes a time determination processor which determines a time for acquiring state information on an operation system, from the operation system, on the basis of a processing status of tasks executed by the operation system, the processing status being acquired from the operation system, an information acquisition processor which acquires the state information and stores the state information in a storage, at the determined time for acquiring state information, and an information reply processor which sends back the state information stored in the storage, when an acquisition request for the state information is received from any of one or a plurality of monitoring apparatuses which monitor the operation system.

6 Claims, 22 Drawing Sheets

(56) References Cited

U.S. PATENT DOCUMENTS

| | | | |
|---|---|---|---|
| 2008/0307258 A1* | 12/2008 | Challenger | G06F 11/1438 714/20 |
| 2011/0138397 A1* | 6/2011 | Kikuchi | G06F 11/3476 718/106 |
| 2012/0053868 A1* | 3/2012 | Matsumoto | G06F 1/28 702/61 |
| 2013/0332930 A1* | 12/2013 | Towata | G06F 9/4812 718/102 |
| 2013/0346986 A1* | 12/2013 | Goetz | G06F 9/485 718/102 |
| 2014/0298350 A1* | 10/2014 | Kimata | G06F 9/5027 718/104 |
| 2014/0368866 A1* | 12/2014 | Kikumoto | G06K 15/005 358/1.15 |
| 2014/0372810 A1* | 12/2014 | Na | G06F 11/3433 714/47.1 |
| 2015/0058865 A1* | 2/2015 | Slinger | G06F 9/46 718/106 |
| 2015/0278693 A1* | 10/2015 | Sakai | G06N 5/04 706/58 |
| 2015/0370599 A1* | 12/2015 | Jiang | G06F 9/485 718/102 |
| 2016/0011908 A1* | 1/2016 | Paul | G06F 9/5027 718/104 |
| 2017/0109207 A1* | 4/2017 | Li | G06F 9/505 |

FOREIGN PATENT DOCUMENTS

| | | |
|---|---|---|
| JP | 2007-520806 | 7/2007 |
| WO | 2005069144 | 7/2005 |

* cited by examiner

FIG. 13

TIME INFORMATION 633

| INITIAL VALUE | NEXT SET VALUE |
|---|---|
| 30 | — |

FIG. 14

TASK INFORMATION 631

| ID | TASK TYPE | START TIME | END TIME | STATE OF PROGRESS |
|---|---|---|---|---|
| 1 | CREATE MACHINE | 2014-01-01 00:00:00 | 2014-01-01 00:10:03 | 100% |
| 2 | DELETE NETWORK | 2014-01-01 00:12:00 | 2014-01-01 00:14:00 | 100% |
| 3 | DELETE MACHINE | 2014-01-02 18:28:00 | 2014-01-02 18:29:00 | 100% |
| 4 | ADD DISK | 2014-01-03 08:15:00 | 2014-01-03 08:17:00 | 100% |
| 5 | EXPAND DISK | 2014-01-03 10:31:00 | 2014-01-03 10:33:00 | 100% |
| 6 | CREATE MACHINE | 2014-01-04 00:02:00 | 2014-01-04 00:12:10 | 100% |
| 7 | DELETE MACHINE | 2014-01-04 03:20:00 | 2014-01-04 03:30:00 | 100% |
| 8 | DELETE MACHINE | 2014-01-04 18:07:00 | 2014-01-0418:08:10 | 100% |
| 9 | ADD DISK | 2014-01-05 08:41:00 | 2014-01-05 08:43:03 | 100% |
| 10 | CREATE MACHINE | 2014-01-05 10:23:00 | 2014-01-05 10:32:59 | 100% |

FIG. 15

TASK INFORMATION 631

| ID | TASK TYPE | START TIME | END TIME | STATE OF PROGRESS |
|---|---|---|---|---|
| 1 | CREATE MACHINE | 2014-01-01 00:00:00 | 2014-01-01 00:10:03 | 100% |
| 2 | DELETE NETWORK | 2014-01-01 00:12:00 | 2014-01-01 00:14:00 | 100% |
| 3 | DELETE MACHINE | 2014-01-02 18:28:00 | 2014-01-02 18:29:00 | 100% |
| 4 | ADD DISK | 2014-01-03 08:15:00 | 2014-01-03 08:17:00 | 100% |
| 5 | EXPAND DISK | 2014-01-03 10:31:00 | 2014-01-03 10:33:00 | 100% |
| 6 | CREATE MACHINE | 2014-01-04 00:02:00 | 2014-01-04 00:12:10 | 100% |
| 7 | DELETE MACHINE | 2014-01-04 03:20:00 | 2014-01-04 03:30:00 | 100% |
| 8 | DELETE MACHINE | 2014-01-04 18:07:00 | 2014-01-04 18:08:10 | 100% |
| 9 | ADD DISK | 2014-01-05 08:41:00 | 2014-01-05 08:43:03 | 100% |
| 10 | CREATE MACHINE | 2014-01-05 10:23:00 | 2014-01-05 10:32:59 | 100% |
| 11 | ADD DISK | 2014-01-05 18:38:00 | 2014-01-05 18:40:03 | 100% |

FIG. 16

STATE INFORMATION 632

| ID | CATEGORY | NAME | ITEM | CURRENT INFORMATION |
|---|---|---|---|---|
| 1 | MACHINE | MACHINE A | NUMBER OF CPUS | 8 |
| 2 | | | CPU FREQUENCY | 3.0(GHz) |
| 3 | | | MEMORY CAPACITY | 16(GB) |
| 4 | | | DISK CAPACITY | 320(GB) |
| 5 | | MACHINE B | NUMBER OF CPUS | 8 |
| 6 | | | CPU FREQUENCY | 3.0(GHz) |
| 7 | | | MEMORY CAPACITY | 16(GB) |
| 8 | | | DISK CAPACITY | 320(GB) |
| 9 | NETWORK | NETWORK A | IP ADDRESS | 192.168.1.0 |
| 10 | | | NUMBER OF IP | 200 |
| 11 | | | NUMBER OF IP USED | 100 |
| 12 | | NETWORK B | IP ADDRESS | 192.168.2.0 |
| 13 | | | NUMBER OF IP | 200 |
| 14 | | | NUMBER OF IP USED | 120 |
| 15 | STORAGE | STORAGE A | DISK CAPACITY | 4000(GB) |
| 16 | | | USED CAPACITY | 1000(GB) |
| 17 | | | SPEED | 12800 |

FIG. 17

STATE INFORMATION 632

| ID | CATEGORY | NAME | ITEM | CURRENT INFORMATION |
|---|---|---|---|---|
| 1 | MACHINE | MACHINE A | NUMBER OF CPUS | 8 |
| 2 | | | CPU FREQUENCY | 3.0(GHz) |
| 3 | | | MEMORY CAPACITY | 16(GB) |
| 4 | | | DISK CAPACITY | 480(GB) |
| 5 | | MACHINE B | NUMBER OF CPUS | 8 |
| 6 | | | CPU FREQUENCY | 3.0(GHz) |
| 7 | | | MEMORY CAPACITY | 16(GB) |
| 8 | | | DISK CAPACITY | 320(GB) |
| 9 | NETWORK | NETWORK A | IP ADDRESS | 192.168.1.0 |
| 10 | | | NUMBER OF IP | 200 |
| 11 | | | NUMBER OF IP USED | 100 |
| 12 | | NETWORK B | IP ADDRESS | 192.168.2.0 |
| 13 | | | NUMBER OF IP | 200 |
| 14 | | | NUMBER OF IP USED | 120 |
| 15 | STORAGE | STORAGE A | DISK CAPACITY | 4000(GB) |
| 16 | | | USED CAPACITY | 1000(GB) |
| 17 | | | SPEED | 12800 |

FIG. 18

STATE INFORMATION 632

| ID | CATEGORY | NAME | ITEM | CURRENT INFORMATION |
|----|----------|------|------|---------------------|
| 1 | MACHINE | MACHINE A | NUMBER OF CPUS | 8 |
| 2 | | | CPU FREQUENCY | 3.0(GHz) |
| 3 | | | MEMORY CAPACITY | 16(GB) |
| 4 | | | DISK CAPACITY | 480(GB) |
| 5 | | MACHINE B | NUMBER OF CPUS | 8 |
| 6 | | | CPU FREQUENCY | 3.0(GHz) |
| 7 | | | MEMORY CAPACITY | 16(GB) |
| 8 | | | DISK CAPACITY | 320(GB) |
| 9 | NETWORK | NETWORK A | IP ADDRESS | 192.168.1.0 |
| 10 | | | NUMBER OF IP | 200 |
| 11 | | | NUMBER OF IP USED | 100 |
| 12 | | NETWORK B | IP ADDRESS | 192.168.2.0 |
| 13 | | | NUMBER OF IP | 200 |
| 14 | | | NUMBER OF IP USED | 120 |
| 15 | STORAGE | STORAGE A | DISK CAPACITY | 4000(GB) |
| 16 | | | USED CAPACITY | 1150(GB) |
| 17 | | | SPEED | 12800 |

FIG. 19

TASK INFORMATION 631

| ID | TASK TYPE | START TIME | END TIME | STATE OF PROGRESS |
|---|---|---|---|---|
| 1 | CREATE MACHINE | 2014-01-01 00:00:00 | 2014-01-01 00:10:03 | 100% |
| 2 | DELETE NETWORK | 2014-01-01 00:12:00 | 2014-01-01 00:14:00 | 100% |
| 3 | DELETE MACHINE | 2014-01-02 18:28:00 | 2014-01-02 18:29:00 | 100% |
| 4 | ADD DISK | 2014-01-03 08:15:00 | 2014-01-03 08:17:00 | 100% |
| 5 | EXPAND DISK | 2014-01-03 10:31:00 | 2014-01-03 10:33:00 | 100% |
| 6 | CREATE MACHINE | 2014-01-04 00:02:00 | 2014-01-04 00:12:10 | 100% |
| 7 | DELETE MACHINE | 2014-01-04 03:20:00 | 2014-01-04 03:30:00 | 100% |
| 8 | DELETE MACHINE | 2014-01-04 18:07:00 | 2014-01-04 18:08:10 | 100% |
| 9 | ADD DISK | 2014-01-05 08:41:00 | 2014-01-05 08:43:03 | 100% |
| 10 | CREATE MACHINE | 2014-01-05 10:23:00 | 2014-01-05 10:32:59 | 100% |
| 11 | ADD DISK | 2014-01-05 18:38:00 | 2014-01-05 18:40:03 | 100% |
| 12 | EXPAND DISK | 2014-01-06 08:42:00 | 2014-01-06 08:44:00 | 100% |
| 13 | CREATE MACHINE | 2014-01-06 08:57:00 | -- | 25% |

FIG. 20

TIME INFORMATION 633

| INITIAL VALUE | NEXT SET VALUE |
|---|---|
| 30 | 453 |

FIG. 21

TIME INFORMATION 633

| INITIAL VALUE | NEXT SET VALUE |
|---|---|
| 30 | 2014-01-06 09:07:04 |

FIG. 22

TASK INFORMATION 631

| ID | TASK TYPE | START TIME | END TIME | STATE OF PROGRESS |
|---|---|---|---|---|
| 1 | CREATE MACHINE | 2014-01-01 00:00:00 | 2014-01-01 00:10:03 | 100% |
| 2 | DELETE NETWORK | 2014-01-01 00:12:00 | 2014-01-01 00:14:00 | 100% |
| 3 | DELETE MACHINE | 2014-01-02 18:28:00 | 2014-01-02 18:29:00 | 100% |
| 4 | ADD DISK | 2014-01-03 08:15:00 | 2014-01-03 08:17:00 | 100% |
| 5 | EXPAND DISK | 2014-01-03 10:31:00 | 2014-01-03 10:33:00 | 100% |
| 6 | CREATE MACHINE | 2014-01-04 00:02:00 | 2014-01-04 00:12:10 | 100% |
| 7 | DELETE MACHINE | 2014-01-04 03:20:00 | 2014-01-04 03:30:00 | 100% |
| 8 | DELETE MACHINE | 2014-01-04 18:07:00 | 2014-01-04 18:08:10 | 100% |
| 9 | ADD DISK | 2014-01-05 08:41:00 | 2014-01-05 08:43:03 | 100% |
| 10 | CREATE MACHINE | 2014-01-05 10:23:00 | 2014-01-05 10:32:59 | 100% |
| 11 | ADD DISK | 2014-01-05 18:38:00 | 2014-01-05 18:40:03 | 100% |
| 12 | EXPAND DISK | 2014-01-06 08:42:00 | 2014-01-06 08:44:00 | 100% |
| 13 | CREATE MACHINE | 2014-01-06 08:57:00 | 2014-01-06 09:57:04 | 100% |

INFORMATION PROCESSING APPARATUS, INFORMATION PROCESSING SYSTEM AND PROGRAM

CROSS-REFERENCE TO RELATED APPLICATION

This application is based upon and claims the benefit of priority of the prior Japanese Patent Application No. 2015-066310, filed on Mar. 27, 2015, the entire contents of which are incorporated herein by reference.

FIELD

The present invention relates to an information processing apparatus, an information processing system and a program.

BACKGROUND

An operator (called "service operator" below) providing a service to users builds an operation system in order to provide a service. In an operation system of this kind, the service operator, for example, prepares an apparatus (called "manager" below) which manages the state, etc. of resources of the operation system, and a terminal (called "operator terminal" below) which is connected to the manager via a network.

The operator terminal sends the manager an application programming interface (API) for requesting execution of a process (also called a "task" below) by the operation system. Consequently, even if the service operator has built the operation system and the manager in remotely located data centers, it is still possible to confirm the operational state of the operation system and to change settings in the hardware, etc. on which the operation system is built (see, for example, Japanese Laid-open Patent Publication No. 2004-021549, Japanese National Publication of International Patent Application No. 2007-520806 and Japanese Laid-open Patent Publication No. H07-302242).

SUMMARY

In an operation system such as that described above, depending on the contents of the process being executed by the operation system, and the like, there are cases where there are multiple operator terminals which have to be connected to the manager. If each of the operator terminals frequently confirms the operational state with the manager, then the processing load on the manager becomes high.

In response to this, it is possible to restrict the processing load on the manager by reducing the frequency at which the operational state of the operation system is confirmed. For example, when an operator terminal has requested execution of a process by the operation system, that operator terminal does not confirm the operational state of the operation system until the predicted completion time for that process. Consequently, it is possible to reduce the frequency at which each operator terminal confirms the operational state of the operation system, when that terminal has requested execution of a process by the operation system.

However, if multiple operator terminals request the execution of processes of the manager, then the operational state of the operation system changes due to the execution of the processes requested by other operator terminals. In this case, an operator terminal which has requested the execution of a process first is not able to detect change in the operational state of the operation system caused by other operator terminals, until the operator terminal has recommenced confirmation of the operational state.

According to an aspect of the embodiments, an information processing apparatus includes a time determination processor which determines a time for acquiring state information on an operation system, from the operation system, on the basis of a processing status of tasks executed by the operation system, the processing status being acquired from the operation system, an information acquisition processor which acquires the state information and stores the state information in a storage, at the determined time, and an information reply processor which sends back the state information stored in the storage, when an acquisition request for the state information is received from any of one or a plurality of monitoring apparatuses which monitor the operation system.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 13 illustrates the details of the information management process and the information acquisition process according to the first embodiment.

FIG. 14 illustrates the details of the information management process and the information acquisition process according to the first embodiment.

FIG. 15 illustrates the details of the information management process and the information acquisition process according to the first embodiment.

FIG. 16 illustrates the details of the information management process and the information acquisition process according to the first embodiment.

FIG. 17 illustrates the details of the information management process and the information acquisition process according to the first embodiment.

FIG. 18 illustrates the details of the information management process and the information acquisition process according to the first embodiment.

FIG. 19 illustrates the details of the information management process and the information acquisition process according to the first embodiment.

FIG. 20 illustrates the details of the information management process and the information acquisition process according to the first embodiment.

FIG. 21 illustrates the details of the information management process and the information acquisition process according to the first embodiment.

FIG. 22 illustrates the details of the information management process and the information acquisition process according to the first embodiment.

DESCRIPTION OF THE EMBODIMENTS (Configuration of Information Processing System)

Figure 1:
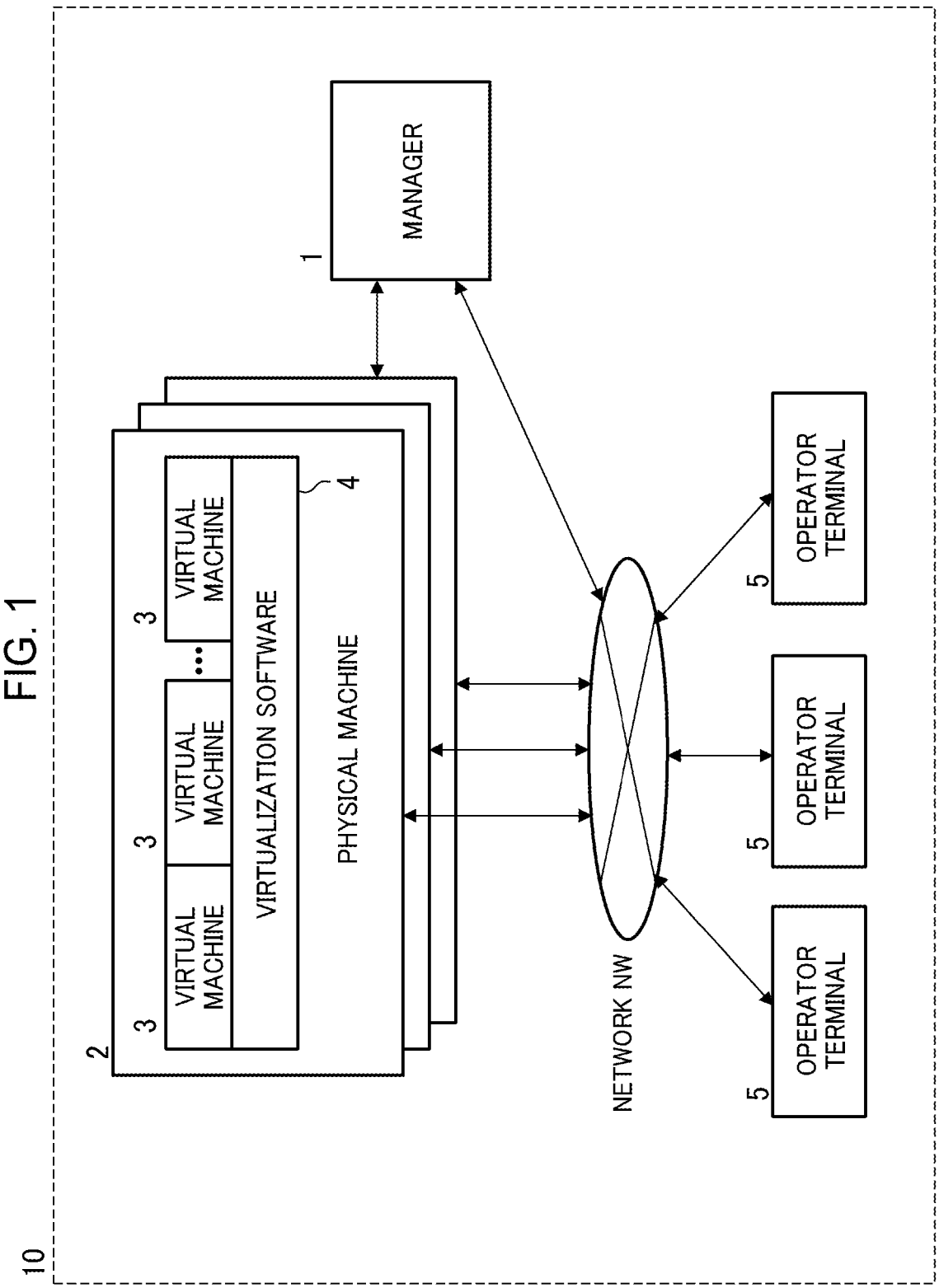
FIG. 1 illustrates the general configuration of an information processing system.

FIG. 1 illustrates the general configuration of an information processing system. The information processing system 10 illustrated in FIG. 1 includes a manager 1, a physical machine 2, and an operator terminal 5 (also called "monitoring apparatus 5" below). The operator terminal 5 is one or more terminal which can access the manager 1 and the physical machines 2 via a network NW.

In the example in FIG. 1, the physical machine 2 is configured by a plurality of physical machines. The resources of the physical machines 2 are allocated to a plurality of virtual machines 3.

The manager 1 is able to access the virtual machines 3 created on the physical machines 2, and manages the virtual machines 3. More specifically, the manager 1 manages the state of the virtual machine 3, such as the use rate of the central processing unit (CPU) and/or the free capacity of the memory (also called "operational state" below). The manager 1 may be created in a portion of the virtual machines 3 created in a physical machine 2, for example.

The virtual machines 3, for example, provide infrastructure to the service operator via the network (also called a "cloud service" below). The service operator builds an operation system for providing services to a user, for example, on the virtual machines 3.

A cloud service is a service in which a basis for constructing and operating a computer system, in other words, the actual infrastructure of the virtual machines 3 and network, etc. is provided via a network. More specifically, a service operator, for example, accesses a cloud service portal site from an operator terminal 5, selects the specifications needed in the virtual machines, and establishes a cloud use contract in respect thereof. The specifications of the virtual machine relate, for example, to the CPU clock frequency, memory capacity (GB), hard disk capacity (MB/sec, IOPS) and network communication bandwidth (Gbps).

Moreover, the virtual machines 3 hold, in a hard disk, an image file which includes the operating system (OS), middleware, application and database, etc., for example. The virtual machines 3, for example, write the image file from the hard disk to the memory upon starting up, for example, and carry out operations corresponding to a desired service.

The operator terminal 5 is, for example, a terminal which can be used by a system administrator of the service operator (also called simply "system administrator" below). Therefore, the operator terminal 5 may be located in a work center of the service operator, for example.

The operator terminal 5, for example, sends an API for requesting execution of a task by the operation system, to the manager 1, in response to inputs made by the system administrator. Consequently, even if the physical machines 2 and/or the manager 1 are situated in a remote location, the system administrator is still able to confirm the operational state of the virtual machines 3 and/or perform operations in respect of the virtual machines (for example creating and deleting virtual machines), in relation to the operation system.

Virtualization software 4 is basic software for running virtual machines 3 by allocating the resources of the physical machines 2 (for example, the resources of the CPU, memory, hard disk and network) in accordance with instructions from the manager 1. The virtualization software 4 runs on a physical machine 2, for example.

(Confirmation of Operational State of Operation System)

Figure 2:
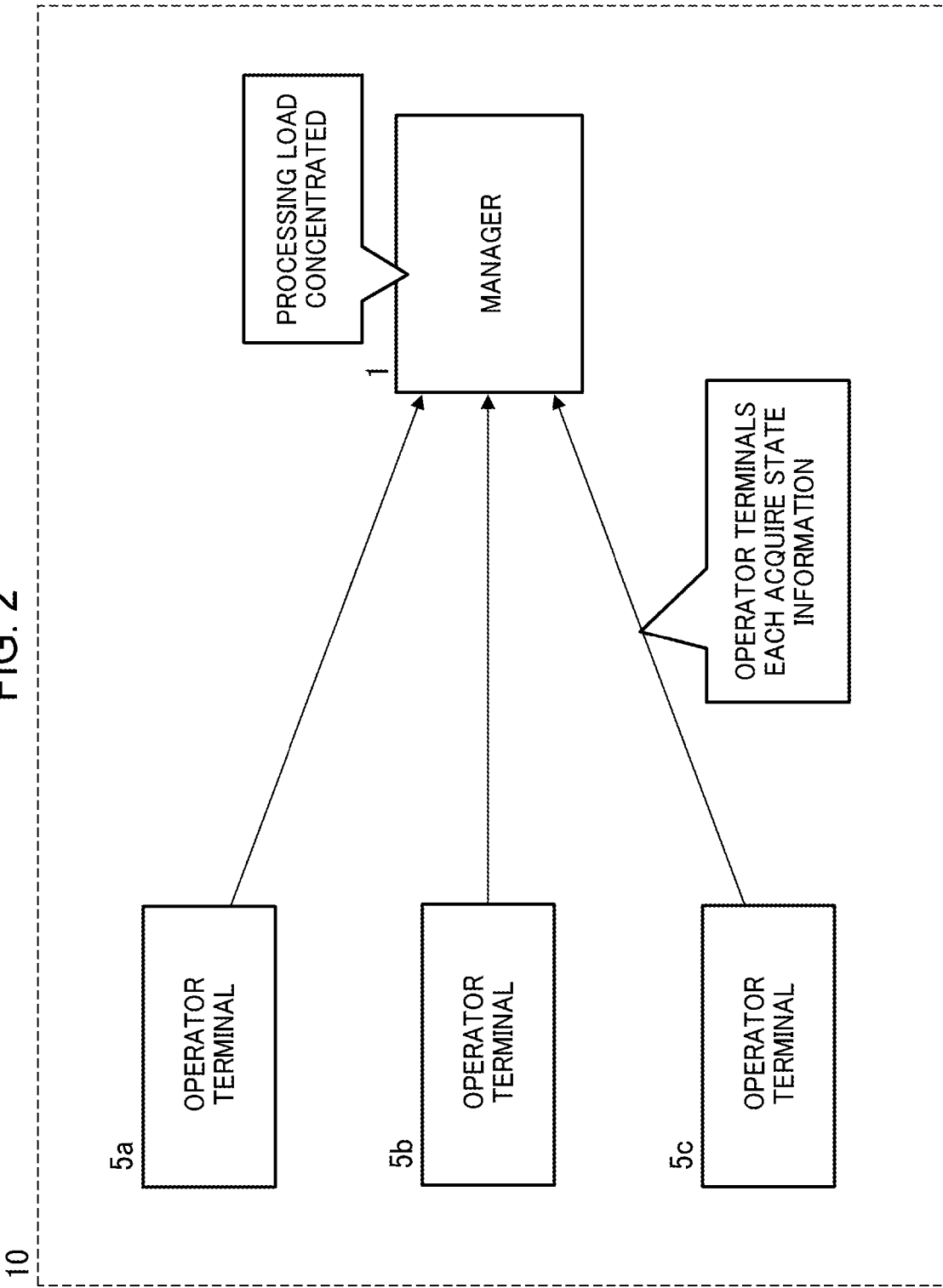
FIG. 2 is a diagram illustrating the confirmation of the operational state of an operation system.

FIG. 2 is a diagram illustrating the confirmation of the operational state of an operation system. In the example illustrated in FIG. 2, the operator terminals 5a, 5b and 5c confirm the operational state of the operation system which has been built on virtual machines 3, by sending an API to the manager 1.

As illustrated in the example in FIG. 2, when the plurality of operator terminals 5 each send an API to the manager 1 at periodic intervals apart (for example, 20 (s) intervals), then the manager 1 needs to execute processing on the basis of a large number of APIs and therefore the processing load becomes high.

On the other hand, if an operator terminal 5 sends an API for requesting execution of a process (such as generation of a new virtual machine 3, etc.), to the manager 1, then it may be possible to predict the time at which the execution of the requested process will end. This corresponds, more specifically, to cases where the times needed to execute processes requested of the manager 1 in the past by the respective operator terminals 5 (also called "execution time" below) have been stored. In this case, the operator terminal is able to predict the execution time of a process that is newly requested of the manager 1, by referring to the execution times of processes that have been requested in the past.

In this case, after sending an API for requesting execution of a process to the manager 1, the operator terminal 5 waits for the execution time predicted for the requested process to elapse before sending an API for confirming the operation of the operation system. Consequently, the operator terminal 5 is able to restrict the APIs sent to the manager 1 and the processing load can be reduced.

However, as illustrated in the example in FIG. 2, when a plurality of operator terminals 5 send an API to the manager 1, the operational state of the operation system may change due to the execution of processes based on the APIs sent by other operator terminals 5. Therefore, an operator terminal 5 which has sent an API first is not able to ascertain changes in the operational state of the operation system, until the operator terminal 5 sends the subsequent API. Consequently, in this case, an operator terminal 5 which has sent an API first is not able to ascertain changes in the operational state of the operation system, in real time.

Figure 3:
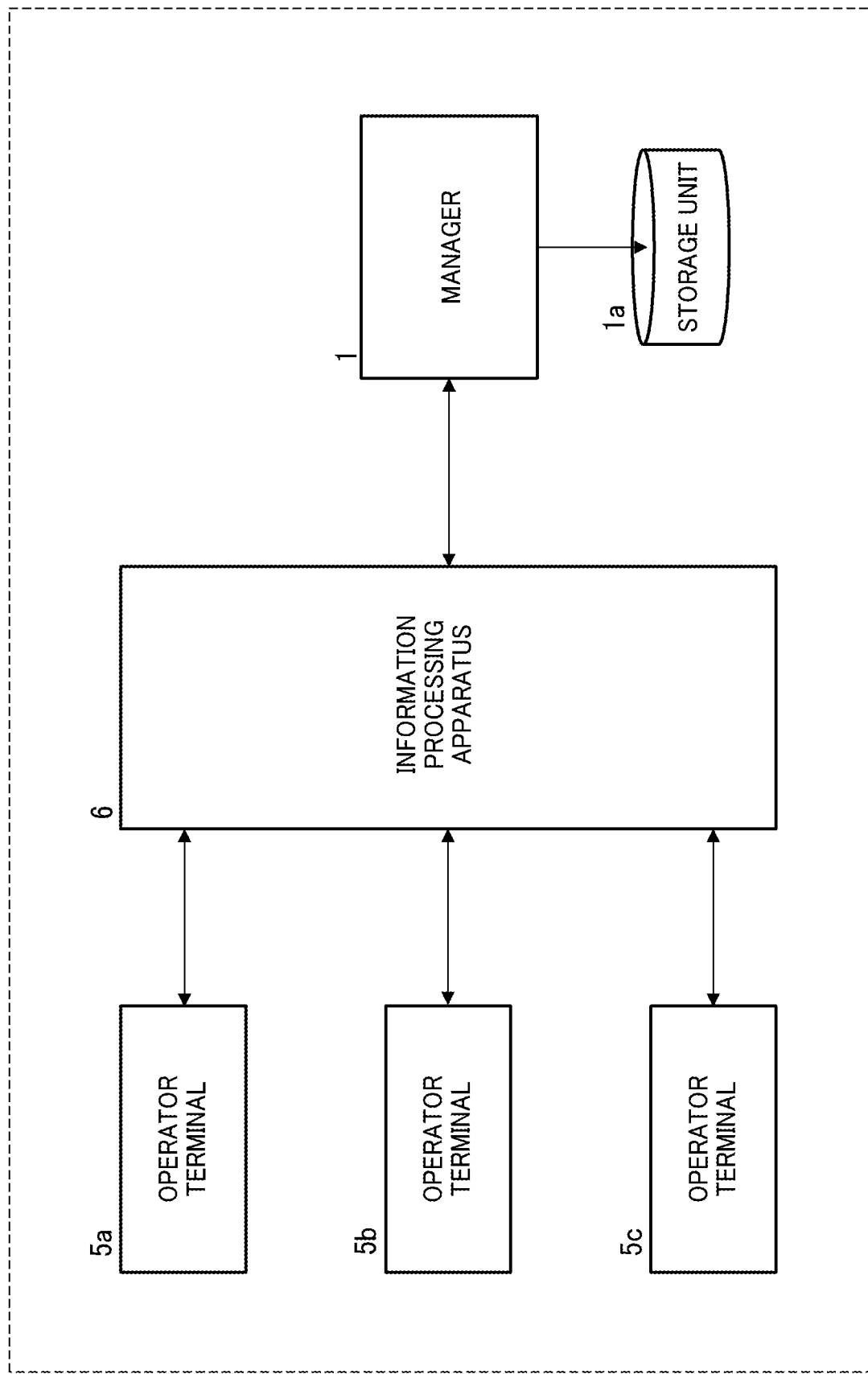
FIG. 3 illustrates an overview of an information management process according to the first embodiment.

Therefore, in the present embodiment, as illustrated in FIG. 3, an information processing apparatus 6 is provided between the operator terminals 5a, 5b and 5c, and the manager 1. This information processing apparatus 6 is, for example, a portion of the virtual machines 3 illustrated in FIG. 1.

As illustrated in FIG. 3, the information processing apparatus 6 accesses the storage unit is of the manager 1, for example, and acquires information indicating the processing status of the tasks running on the operation system (also called "task information" below). Thereupon, the information processing apparatus 6 sends an API to the manager 1 at a time determined on the basis of the acquired task information, and acquires information for confirming the operational state of the operation system (also called "state information" below). Meanwhile, if the information processing apparatus 6 has received a request (API) for the acquisition of the operational state of the operation system from the operator terminals 5a, 5b and 5c, then the information processing apparatus 6 sends a reply on the basis of the state information acquired from the manager 1.

Consequently, when acquiring the operational information on the operation system, the operator terminals 5a, 5b and 5c do not need to send an API to the manager 1. Therefore, the information processing apparatus 6 is able to restrict the frequency of occurrence of APIs that are to be processed by the manager 1, and the processing load on the manager 1 can be restricted.

(Hardware Configuration of Information Processing System)

Figure 4:
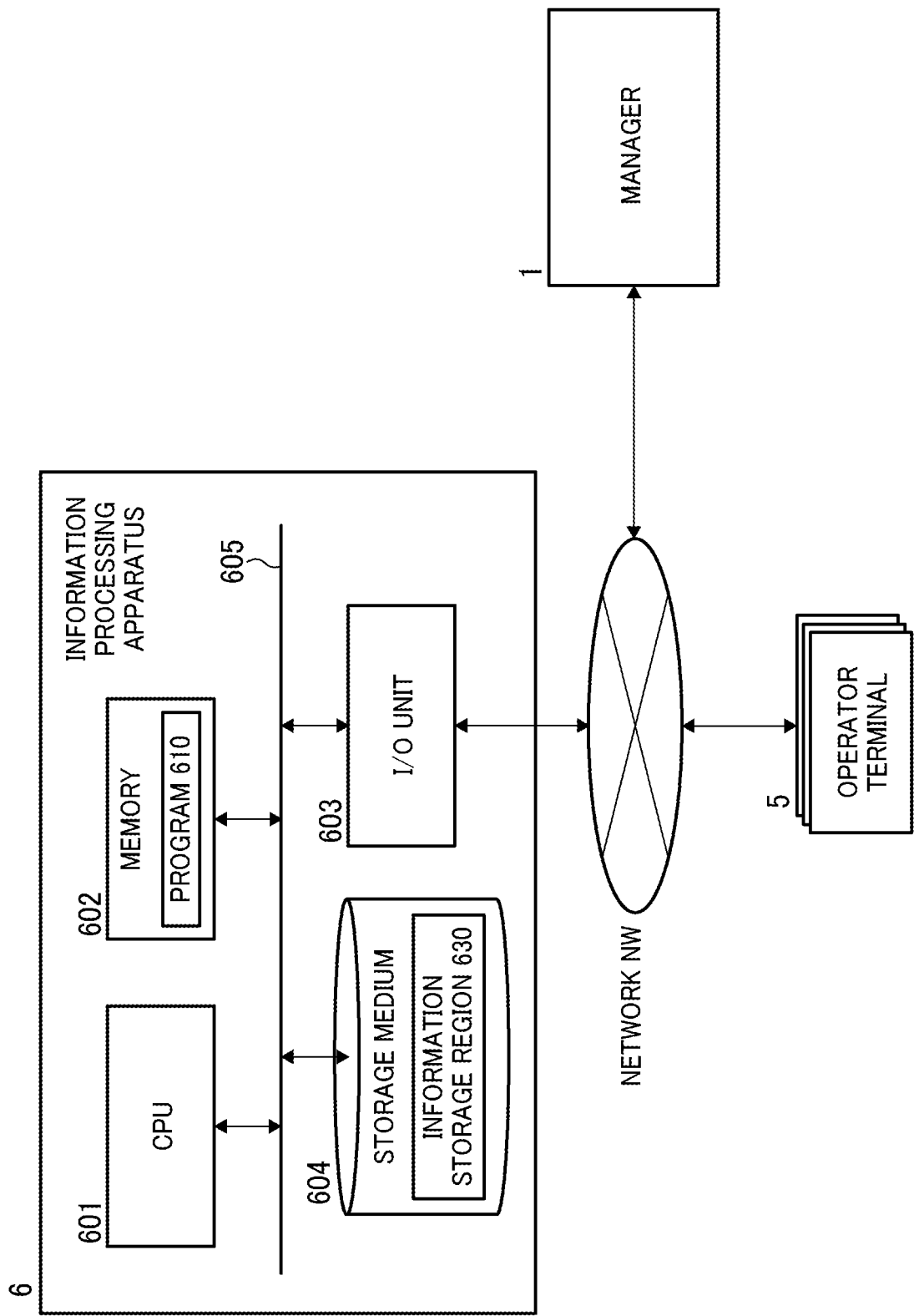
FIG. 4 is a diagram illustrating the hardware configuration of an information processing apparatus.

Next, the configuration of the information processing system 10 will be described. FIG. 4 is a diagram illustrating the hardware configuration of an information processing apparatus. The information processing apparatus 6 includes a CPU 601, which is a processor, a memory 602, an external interface (I/O unit) 603, and a storage medium 604. The respective parts are mutually connected via a bus 605.

The storage medium 604 stores a program 610 for carrying out a process for managing the state information on the operation system (also called "information management process" below), in a program storage region (not illustrated) in the storage medium 604.

As illustrated in FIG. 4, the CPU 601 loads a program 610 from the storage medium 604 to the memory 602, while executing the program 610, and carries out an information management process, and the like, in coordination with the program 610.

Furthermore, the storage medium 604 has, for example, an information storage region 630 (also called "storage unit 630" below) which stores information that is used when carrying out the information management process, and the like.

Figure 5:
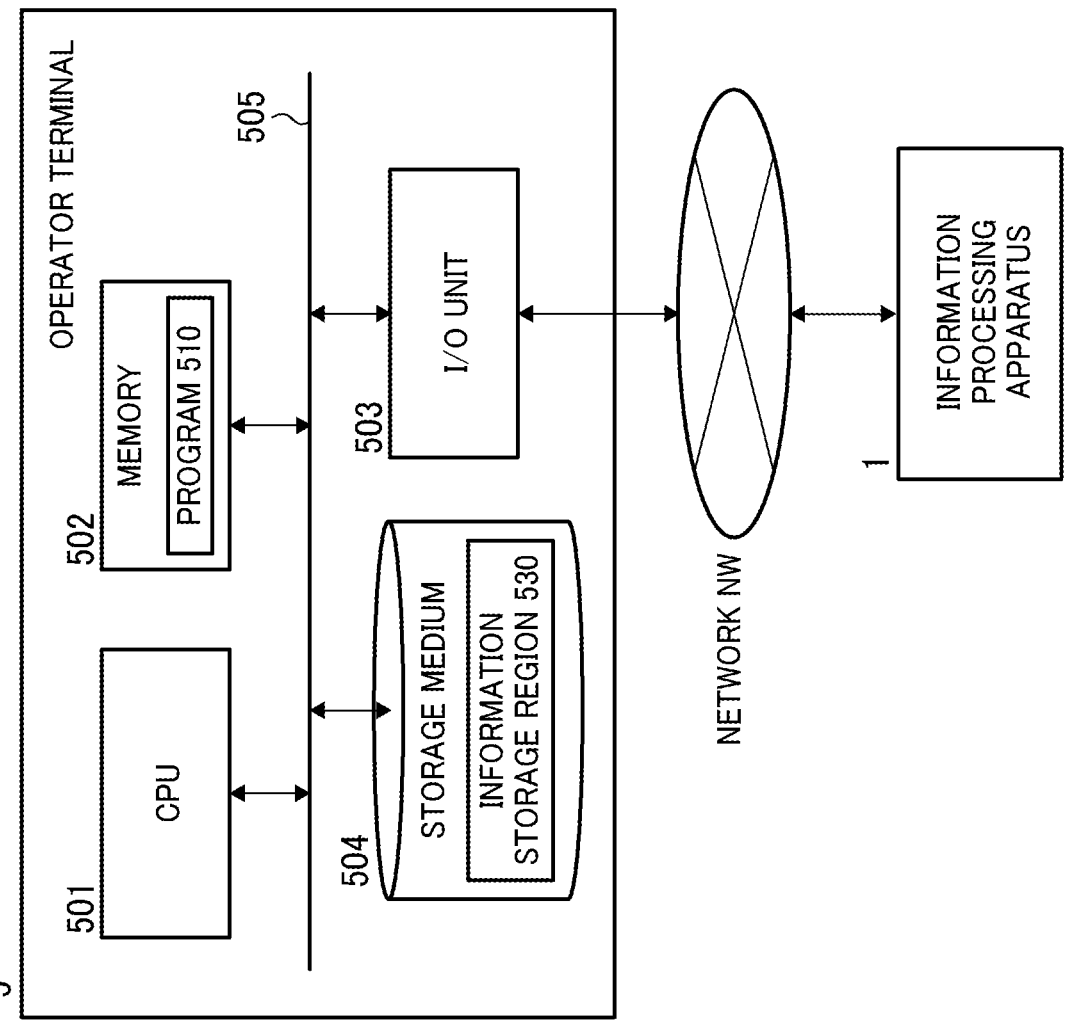
FIG. 5 is a diagram illustrating a hardware configuration of an operator terminal.

FIG. 5 is a diagram illustrating a hardware configuration of an operator terminal. The operator terminal 5 includes a CPU 501 which is a processor, a memory 502, an external interface (I/O unit) 503 and a storage medium 504. The respective parts are mutually connected via a bus 505.

The storage medium 504 stores a program 510 for carrying out a process for acquiring state information on the operation system (also called "information acquisition process" below) in a program storage region (not illustrated) in the storage medium 504, for example.

As illustrated in FIG. 5, the CPU 501 loads the program 510 from the storage medium 504 to the memory 502, while executing the program 510, and carries out an information acquisition process, and the like, in coordination with the program 510.

Furthermore, the storage medium 504 has, for example, an information storage region 530 (also called "storage unit 530" below) which stores information that is used when carrying out the information acquisition process, or the like.

(Software Configuration of Information Processing Apparatus)

Figure 6:
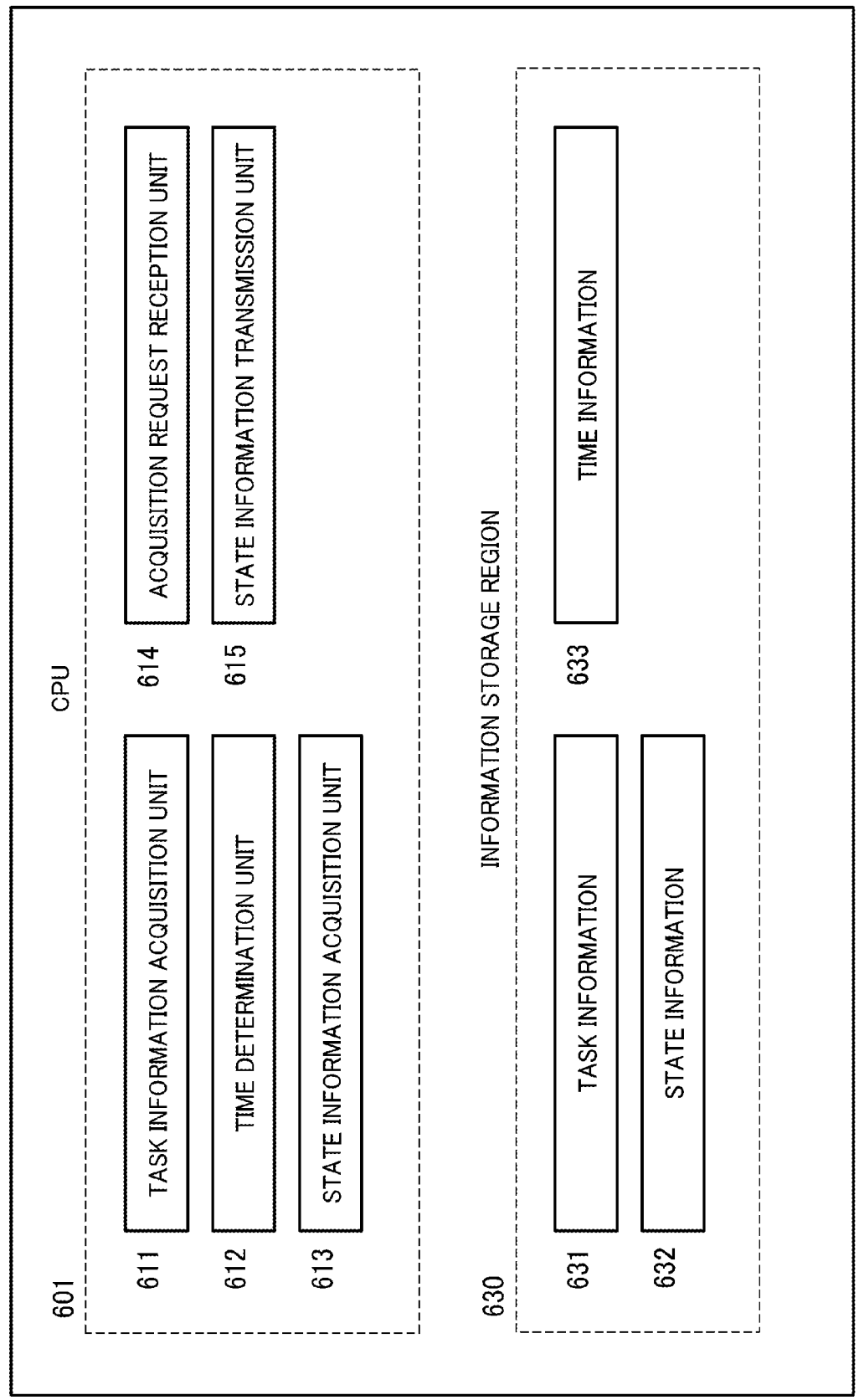
FIG. 6 is a functional block diagram of the information processing apparatus in FIG. 4.

Next, the software configuration of the information processing apparatus 6 will be described. FIG. 6 is a functional block diagram of the information processing apparatus in FIG. 4. The CPU 601, by coordinated operation with the program 610, operates as a task information acquisition unit 611, a time determination unit 612, a state information acquisition unit 613, an acquisition request reception unit 614 and a state information transmission unit 615 (also called "information reply unit 615" below). Furthermore, task information 631, state information 632 and time information 633 are stored in the information storage region 630.

The task information acquisition unit 611, for example, accesses the storage unit 1a of the manager 1 and acquires task information 631 of the operation system. The task information 631 is information which includes progress information about tasks that are being executed by the operation system.

In the example illustrated in FIG. 3, the task information 631 is stored in the storage unit is of the manager 1, but as illustrated in FIG. 6, the task information 631 may also be stored in the information storage region 630 of the information processing apparatus 6. In other words, the task information 631 may be stored in a location (the information storage region 630) other than the storage unit 1a, provided that the location enables the information to be acquired by the information processing apparatus 6.

The time determination unit 612 determines the time at which state information 632 of the operation system is to be acquired from the manager 1 (also called "time information 633"), on the basis of the task information 631 acquired by the task information acquisition unit 611. The state information 632 is information including the hardware specifications and/or current disk usage, etc. in the operation system. A concrete example in which the time determination unit 612 determines the time information 633 is described below.

The state information acquisition unit 613 acquires the state information 632 of the operation system from the manager 1, at a time indicated by the time information 633 determined by the time determination unit 612. The state information acquisition unit 613 stores the state information 632 acquired from the manager 1, in the information storage region 630.

An acquisition request reception unit 614 receives an acquisition request for acquiring the state information 632 of the operation system, from the operator terminal 5. By acquiring the state information 632, the operator terminal 5 outputs information relating to the current state of the operation system, to the system administrator, for example.

Upon receiving an acquisition request from the operator terminal 5, the state information transmission unit 615 sends back the state information 632 stored in the information storage region 630, to the operator terminal 5.

(Software Configuration of Operator Terminal)

Figure 7:
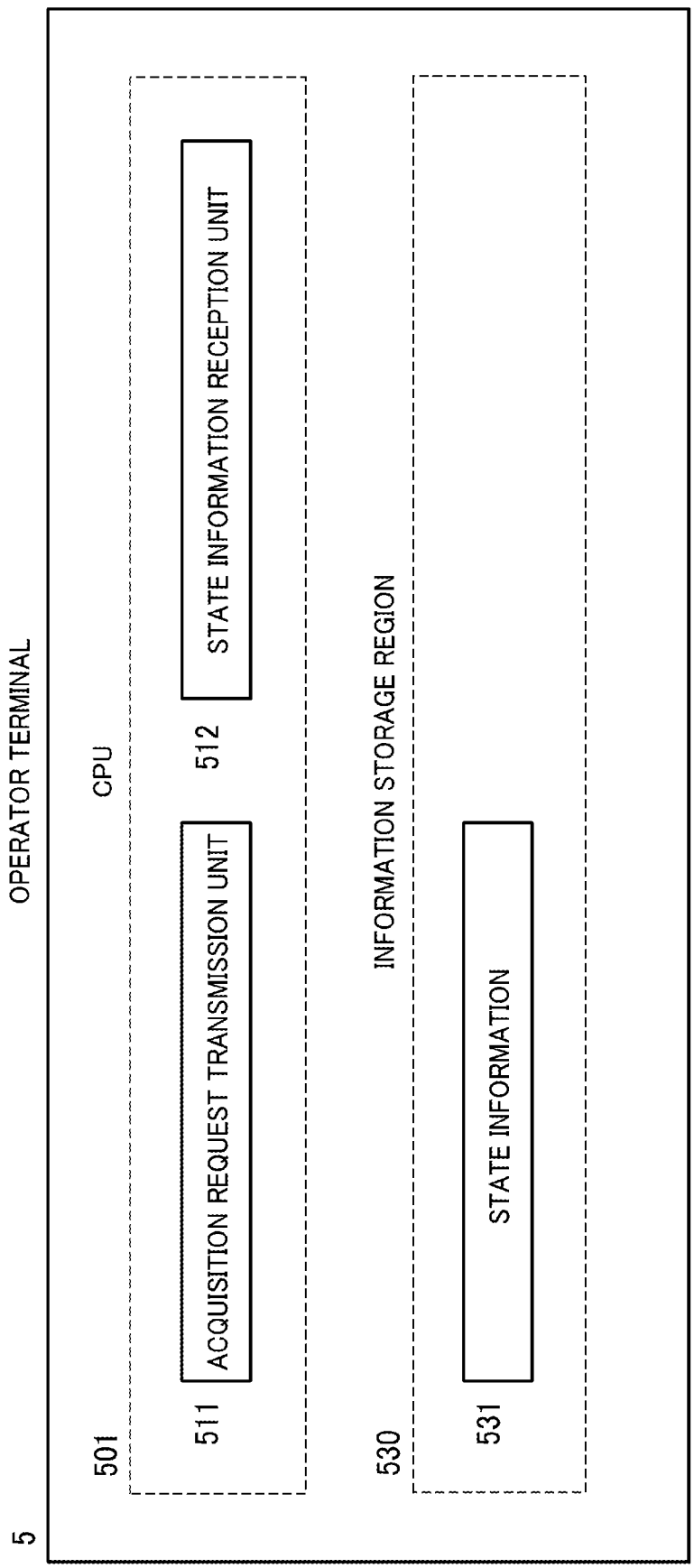
FIG. 7 is a functional block diagram of the operator terminal in FIG. 5.

Next, the software configuration of the operator terminal 5 will be described. FIG. 7 is a functional block diagram of the operator terminal in FIG. 5. The CPU 501, by coordinated operation with the program 510, operates as an acquisition request transmission unit 511 and a state information reception unit 512. Furthermore, the state information 531 is stored in the information storage region 530.

The acquisition request transmission unit 511 transmits an acquisition request for acquiring the state information 632 of the operation system, to the manager 1, at prescribed time intervals (for example, every 20 (s)).

The state information reception unit 512 receives the state information 632 sent by the information processing apparatus 6. The state information reception unit 512, upon receiving the state information 632 from the information processing apparatus 6, updates the contents of the state information 531 stored in the information storage region 530, on the basis of the received state information 632.

Overview of First Embodiment

Figure 8:
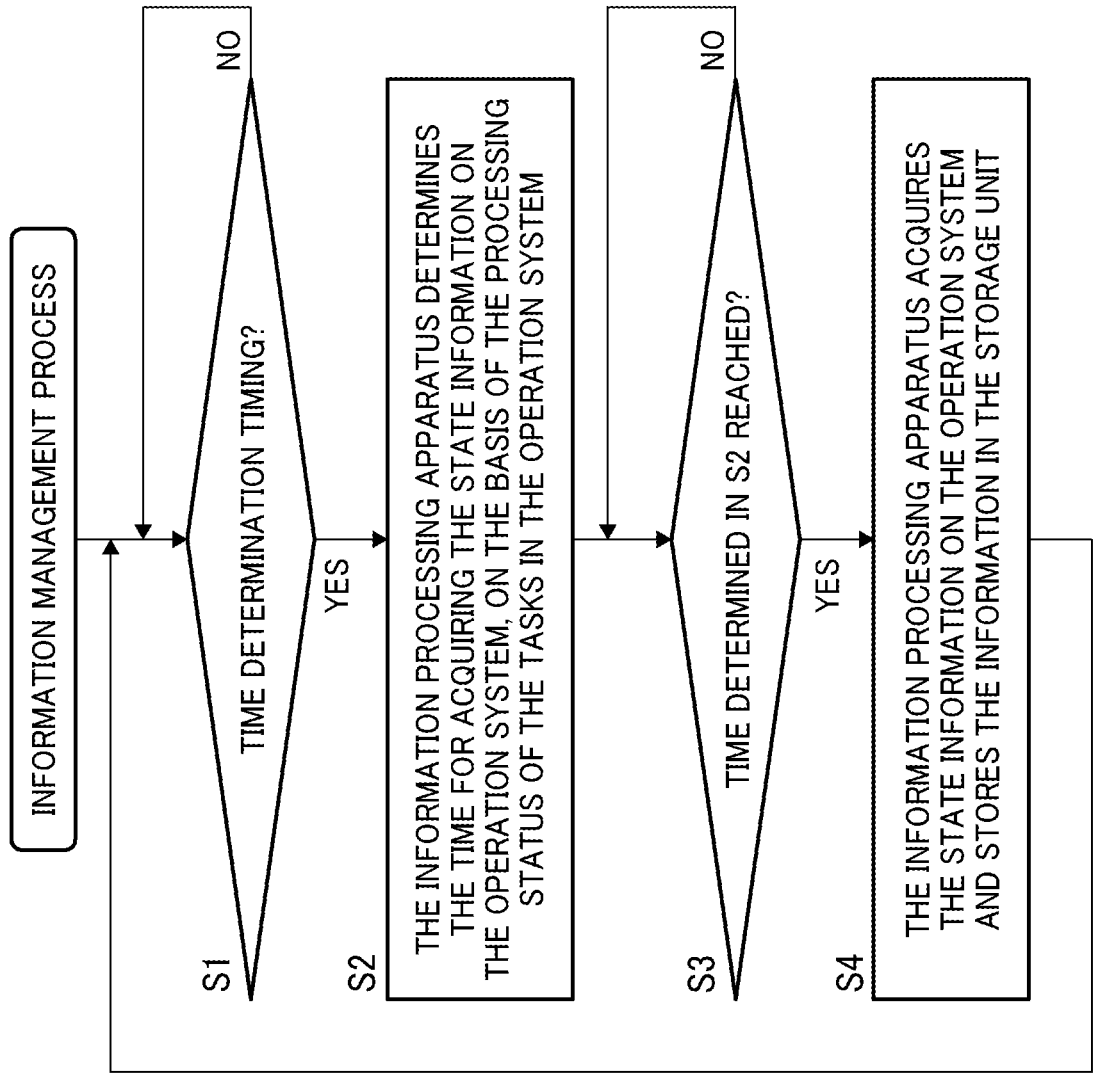
FIG. 8 is a flowchart illustrating an overview of an information management process according to the first embodiment.
Figure 9:
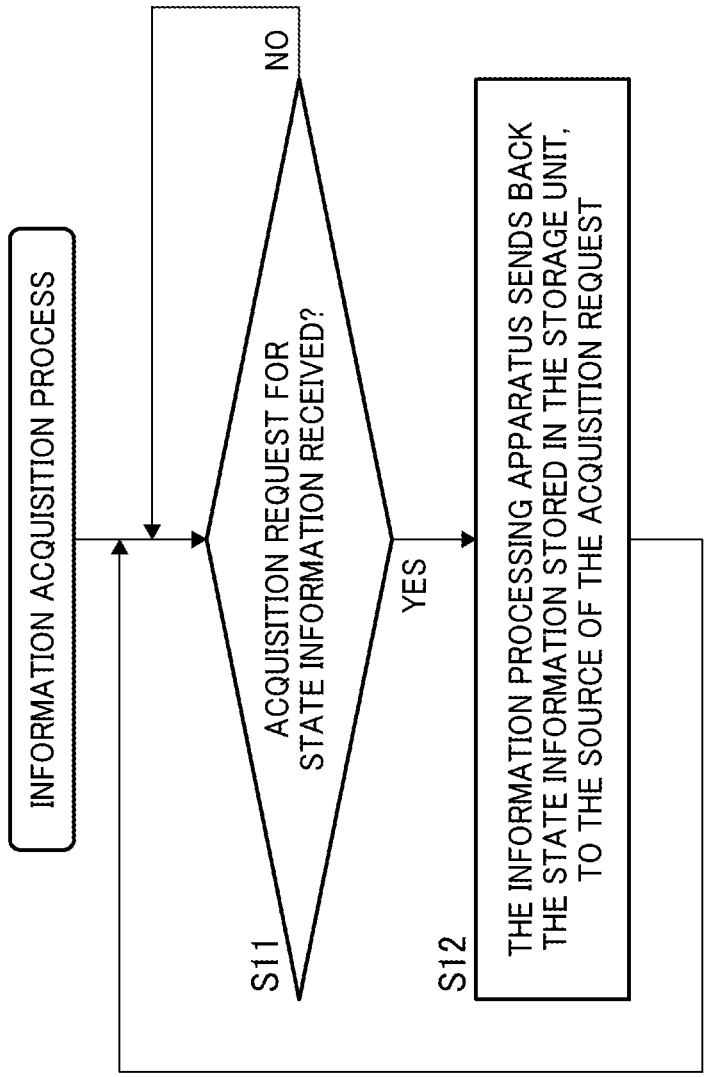
FIG. 9 is a flowchart illustrating an overview of an information management process according to the first embodiment.

Next, an overview of the first embodiment will be described. FIG. 8 and FIG. 9 are flowcharts illustrating an overview of an information management process according to the first embodiment.

(Processing in Information Processing Apparatus)

Firstly, the processing in the information processing apparatus 6 will be described. As illustrated in FIG. 8, the information processing apparatus 6 waits until the timing for determining the time information 633 (also called "time determination timing" below) (NO at S1). This time determination timing may be a periodic interval, for example (such as 5 minute intervals). Furthermore, the time determination timing may be immediately after carrying out the process in S4 described below, for example.

When the time determination timing has been reached (YES at S1), the information processing apparatus 6 determines the time for acquiring the state information 632 of the operation system, on the basis of the processing status of the tasks in the operation system (S2). More specifically, the information processing apparatus 6, for example, refers to the task information 631 acquired from the manager 1 and confirms whether or not there is a task that is currently being executed. If there is a task that is currently being executed, the information processing apparatus 6 calculates the time at which the task currently being executed ends, and the calculated time is determined as time information 633. A concrete example of the calculation of the time information 633 is described below.

In other words, if it is confirmed that there is a task currently being executed in the operation system, the information processing apparatus 6 according to the present embodiment predicts that there is a high probability of the contents of the state information 632 being updated in accordance with the completion of execution of that task. The information processing apparatus 6 determines the timing at which it is predicted that the state information 632 will be updated, as the time to be set as the time information 633. Consequently, the information processing apparatus 6 is able to access the manager 1 and acquire the state information 632 of the operation system, only when it is predicted that there is a high probability that the contents of the state information 632 have been updated. Therefore, the information processing apparatus 6 enables reduction in the processing load on the manager 1 caused by reception of acquisition requests for state information 632.

Next, the information processing apparatus 6 waits until reaching the time indicated by the time information 633 determined in S2 (NO at S3). When the time determined in S2 has been reached (YES at S3), the information processing apparatus 6 acquires the state information 632 of the operation system from the manager 1, and stores the information in the information storage region 630 (S4). More specifically, by sending an API to the manager 1, the information processing apparatus 6 acquires the state information 632 of the operation system. Thereupon, the information processing apparatus 6 waits again for the time determination timing to be reached (NO at S1).

(Processing Relating to Operator Terminal)

Next, the processing relating to the operator terminal 5 will be described. As illustrated in FIG. 9, the information processing apparatus 6 waits until an acquisition request (API) for the state information 632 is received from the operator terminal 5 (NO at S11). When an acquisition request for state information 632 is received from the operator terminal 5 (YES at S11), then the information processing apparatus 6 sends back the state information 632 stored in the information storage region 630, to the operator terminal 5 that sent the acquisition request for state information 632 (S12).

In other words, the information processing apparatus 6 does not send an API for acquiring the state information 632, to the manager 1, upon receiving an API for acquiring the state information 632 from the operator terminal 5. In this case, the information processing apparatus 6 sends back the state information 632 acquired from the manager 1 in S4, to the operator terminal 5 that sent the acquisition request for the state information 632. Accordingly, the information processing apparatus 6 according to the present embodiment is able to restrict the frequency at which the manager 1 receives acquisition requests for the state information 632, and to reduce the processing load on the manager 1.

In this way, according to the first embodiment, the information processing apparatus 6 determines the time for acquiring the state information 632 of the operation system, on the basis of the processing status of the tasks being executed in the operation system. At the determined time, the information processing apparatus 6 acquires the state information on the operation system and stores the information in the storage unit 630. Subsequently, upon receiving an acquisition request for the state information 632 from an operator terminal 5, the information processing apparatus 6 sends back the state information 632 stored in the storage unit 630. Therefore, the information processing apparatus 6 is able to restrict the frequency at which the manager 1 receives acquisition requests for the state information 632, and to reduce the processing load on the manager 1.

Details of First Embodiment

Figure 10:
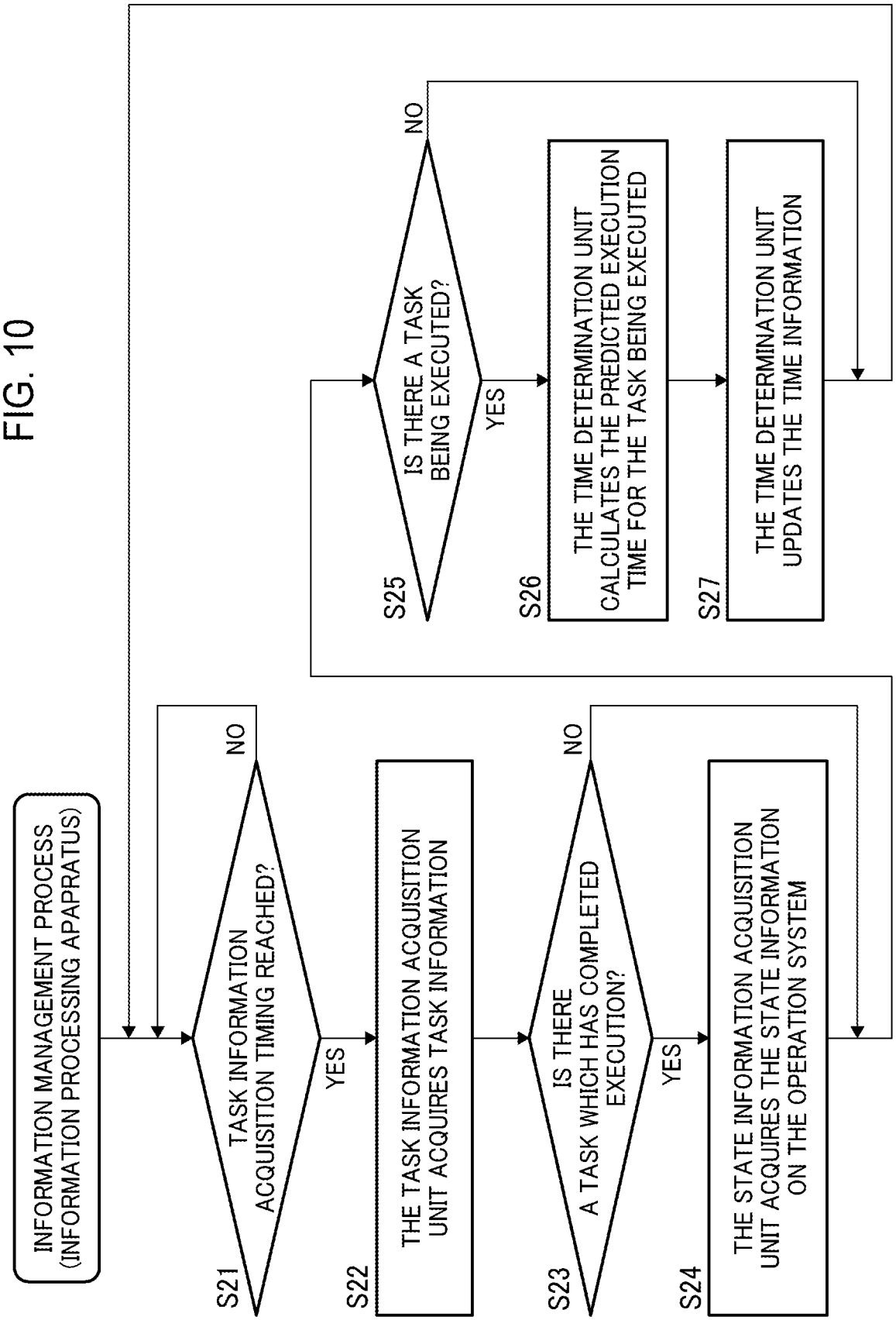
FIG. 10 is a flowchart for describing the details of an information management process according to the first embodiment.
Figure 11:
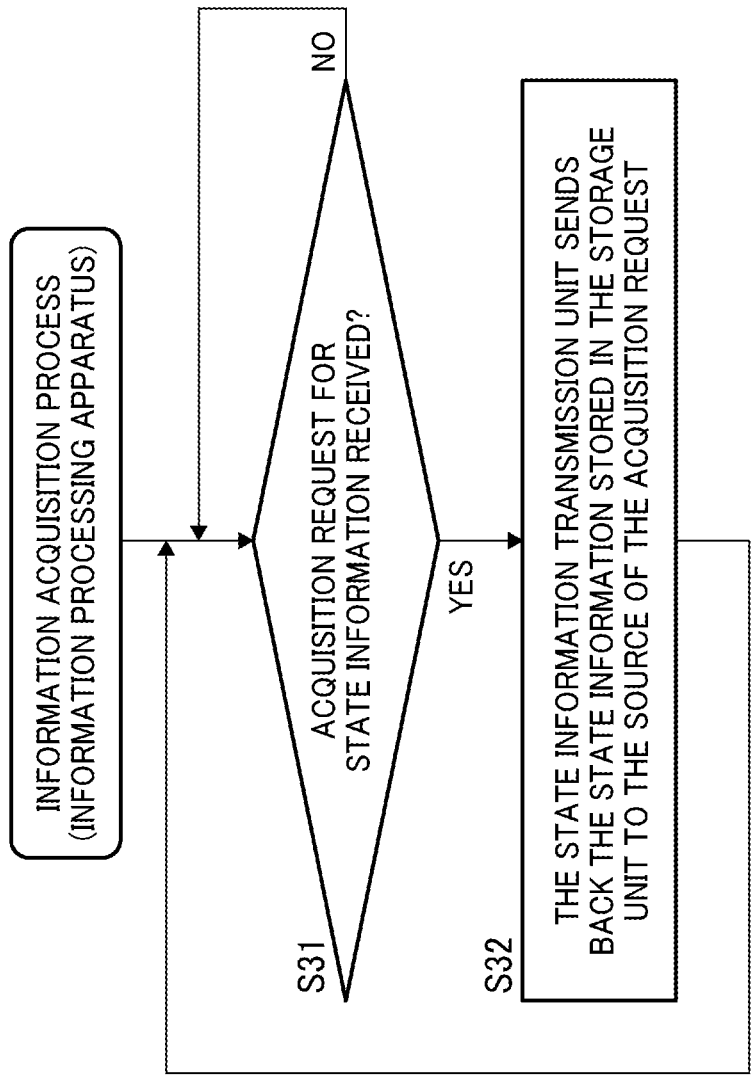
FIG. 11 is a flowchart for describing the details of an information management process according to the first embodiment.
Figure 12:
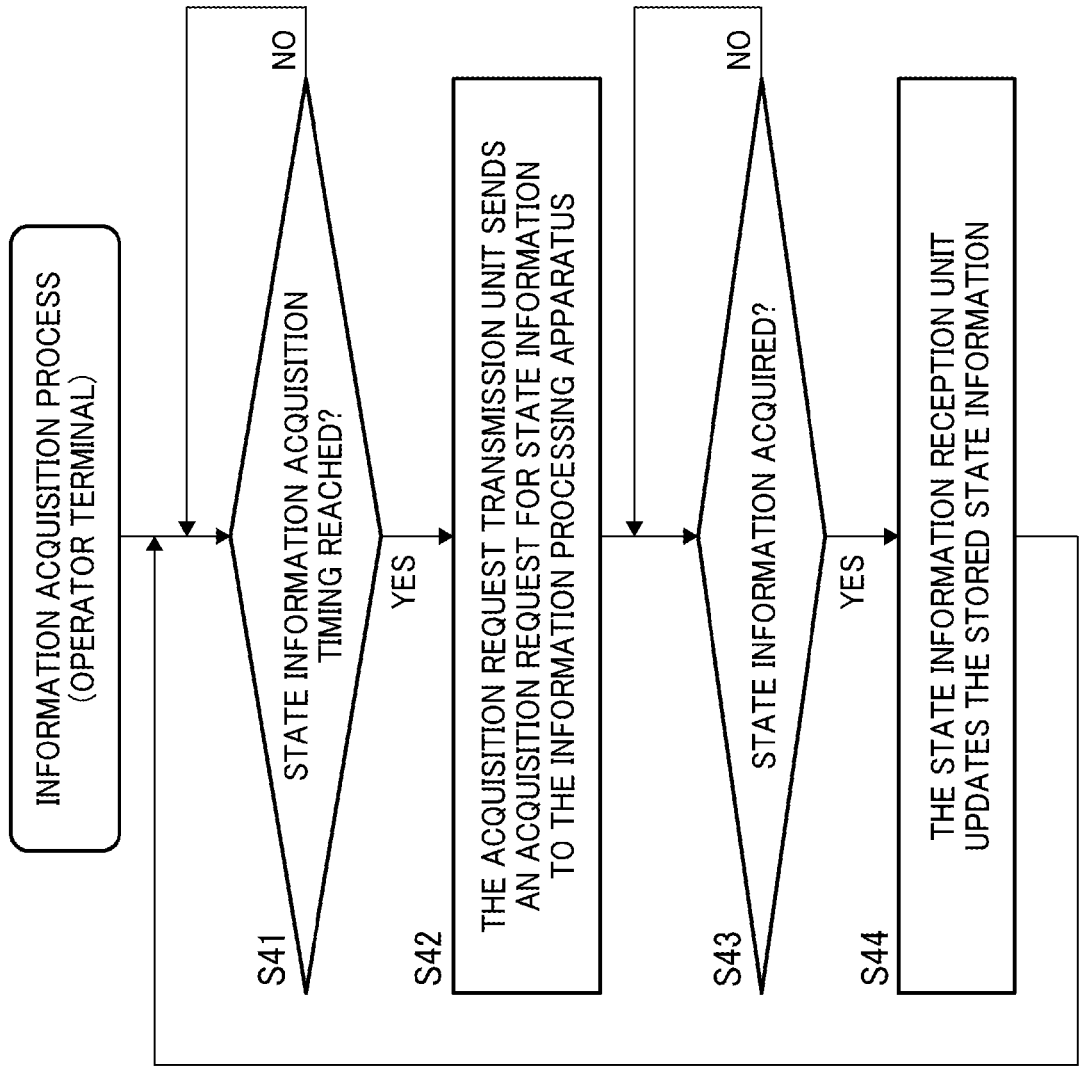
FIG. 12 is a flowchart for describing the details of the information acquisition process according to the first embodiment.

Next, the details of the first embodiment will be described. FIG. 10 and FIG. 11 are flowcharts for describing the details of an information management process according to the first embodiment. Furthermore, FIG. 12 is a flowchart describing the details of the information acquisition process according to the first embodiment. Moreover, FIG. 13 to FIG. 22 illustrate the details of the information management process and the information acquisition process according to the first embodiment. The details of the information management process and the information acquisition process in FIG. 10 to FIG. 12 are described with reference to FIG. 8, FIG. 9 and FIG. 13 to FIG. 22.

(Details of the Information Management Process According to First Embodiment)

Firstly, the details of the information management process according to the first embodiment will be described. The task information acquisition unit 611 of the information processing apparatus 6 waits until the acquisition timing of the task information 631 (NO at S21, NO at S3 in FIG. 8). The acquisition timing of the task information 631 may be a timing when the time set in the time information 633 has elapsed after the time at which the task information acquisition unit 611 previously acquired task information 631. Furthermore, the acquisition timing of the task information 631 may be when the information processing apparatus 6 has received a task execution request (API) relating to the operation system from the operator terminal 5, and sent the received execution request to the manager 1 (when execution of a task has been started in the operation system). Below, a concrete example of the time information 633 is described.

FIG. 13 is a diagram illustrating a concrete example of the time information 633. The time information 633 illustrated in FIG. 13 includes the items "initial value", which indicates an initial value, and "next set value", which indicates the information that is to be applied the next time. The units of the values set in "initial value" and "next set value" are, for instance, "seconds". If a value has been set for "next set value", then the task information acquisition unit 611 refers to the value set in "next set value". On the other hand, if no value has been set in "next set value" (if this value is blank), then the task information acquisition unit 611 refers to the value set in "initial value".

More specifically, in the time information 633 illustrated in FIG. 13, the "initial value" is set to "30", and the "next set value" is blank. Therefore, in this case, the task information acquisition unit 611 refers to "30", which is the value set in "initial value". More specifically, in the example illustrated in FIG. 13, the task information acquisition unit 611 acquires the task information 631 thirty seconds after the previous completion of execution of the information management process.

Returning to FIG. 10, when the acquisition timing of the task information 631 is reached (YES at S21), the task information acquisition unit 611, for example, accesses the manager 1 and acquires the task information 631 (S22; S4 in FIG. 8). A concrete example of the task information 631 is described below.

FIG. 14 is a concrete example of the task information 631. The task information 631 illustrated in FIG. 14 includes the items "ID" which identifies the information, and "task type" which indicates the type of task being executed by the operation system or which has completed execution.

In the task information 631 illustrated in FIG. 14, for example, the values "create machine" which indicates a type of task for creating a virtual machine, and "delete machine" which indicates a type of task for deleting a virtual machine are set in the "task type". Furthermore, for example, the value "delete network" which indicates a type of task for deleting a virtual network which connects together a plurality of virtual machines, for example, is also set in the "task type". Moreover, for example, the values "add disk" which indicates a type of task for adding a number of disk apparatuses which can be used by the virtual machines, and "expand disk" which indicates a type of task for expanding the disk capacity which can be used by the virtual machines, are also set in the "task type".

Furthermore, the task information 631 illustrated in FIG. 14 includes the items "start time" which is the start time of execution of respective tasks, "end time" which is the end time of execution of the respective tasks, and "state of progress" which indicates the state of progress of each task.

More specifically, in the task information 631 illustrated in FIG. 14, "create machine" is set as the "task type" and "2014-01-01 00:00:00" is set as the "start time", in the information having an "ID" of "1". Furthermore, "2014-01-01 00:10:03" is set as the "end time" and "100%" is set as the "state of progress", in the information having an "ID" of "1". The "progress information" included in the task information 631 in FIG. 14 is set to "100%" in all cases. Therefore, the task information 631 illustrated in FIG. 14 indicates that there is no task that is currently being executed. Description of the other information in FIG. 14 is omitted here.

Returning to FIG. 10, the state information acquisition unit 613 of the information processing apparatus 6 refers to the task information 631 acquired in S22 and, for example, compares this information with the task information 631 previously acquired by the task information acquisition unit 631 (the task information 631 stored in the information storage region 630). The state information acquisition unit 613 then determines whether or not there is a task which has newly completed execution (NO at S23).

More specifically, the state information acquisition unit 613 determines whether or not there is a task of which the information is not included in the task information stored in the information storage region 630, but is included in the newly acquired task information 631, and in which the "state of progress" is set to "100%". If there is a task matching these conditions, then the state information acquisition unit 613 determines that there is a task which has newly completed execution.

As a result of this, if it is determined that there is a task which has newly completed execution (YES at S23), the state information acquisition unit 613 acquires state information 632 from the manager 1 (S24). On the other hand, if there is no task which has newly completed execution (NO at S23), then the state information acquisition unit 613 does not acquire the state information 632.

In other words, if the state information acquisition unit 613 has determined that there is a task that has newly completed execution (YES at S23), then it is determined that there is a high probability that the contents of the state information 632 of the operation system have been updated, after acquiring the previous state information 632. Therefore, in this case, the state information acquisition unit 613 accesses the manager 1 and acquires the state information 632. On the other hand, when it is determined that there is no task which has newly completed execution (NO at S23), then the state information acquisition unit 613 determines that there is a low probability that the contents of the state information 632 of the operation system have been updated. Consequently, in this case, the state information acquisition unit 613 does not acquire state information 632.

Consequently, the state information acquisition unit 613 can restrict the frequency at which acquisition requests for the state information 632 are sent to the manager 1. Therefore, the state information acquisition unit 613 is able to restrict the processing load on the manager 1. A concrete example of the processing in S23 is described below.

FIG. 15 is a concrete example of the task information 631 acquired after the state illustrated in FIG. 14. When the task information 631 illustrated in FIG. 15 is compared with the task information 631 illustrated in FIG. 14, only the information having an "ID" of "11" has been added (the underlined portion of the FIG. 15). In the information having an "ID" of "11", a value of "100%" is set as the "state of progress". In other words, the task corresponding to the information having an "ID" of "11" is a task which has started and completed execution after the acquisition of the task information 631 illustrated in FIG. 14 and before the acquisition of the task information 631 illustrated in FIG. 15. Therefore, in the example illustrated in FIG. 15, the state information acquisition unit 613 determines that there is a high probability that the state information 632 has been updated since the acquisition of the previous task information 631, and the state information acquisition unit 613 acquires the state information 632 (YES at S23; S24). Description of the other information in FIG. 15 is omitted here.

Next, a concrete example of the state information 632 will be described. FIG. 16 is a diagram illustrating a concrete example of state information 632. The state information 632 illustrated in FIG. 16 is described with respect to a case where the operation system is configured by two virtual machines (machine A, machine B), two networks (network A, network B), and one storage unit (storage A).

The state information 632 illustrated in FIG. 16 includes the items "ID" which identifies the information, "category" which indicates the category of the information, "name" which indicates a name of the machine, or the like, "item name" which indicates the item name of the information, and "current information" which indicates the current state of the machine, or the like.

More specifically, in the state information 632 illustrated in FIG. 16, the information having an "ID" from "1" to "4" is information relating to a virtual machine in which the "category" is "machine" and the "name" is "machine A". Furthermore, in the information having an "ID" of "1", a value of "8" is set as a "number of CPUs", and in the information having an "ID" of "2", a value of "3.0 (GHz)" is set as a "CPU frequency". Moreover, in the information having an "ID" of "3", a value of "16 (GB)" is set as a "memory capacity", and a value of "320 (GB)" is set as a "disk capacity".

For example, when a task of which the "task type" is "add disk" is executed in the virtual machine of which the "name" is "machine A", then the disk capacity is increased. Therefore, in this case, as illustrated in FIG. 17, the value set as the "disk capacity" in the information of which the "name" is "machine A" is increased. More specifically, in the example illustrated in FIG. 17, the "disk capacity" of the information of which the "name" is "machine A" is updated to "480 (GB)" (the underlined portion in FIG. 17).

Moreover, when a task of which the "task type" is "create machine" is executed in the virtual machine of which the "name" is "machine B", for example, then the disk of the storage unit is used. Therefore, in this case, as illustrated in FIG. 18, the value set as the "use capacity" of the information, the "name" of which is "storage A", is increased. More specifically, in an example depicted in FIG. 18, the "use capacity" of the information, the "name" of which is "storage A" is updated to "1150 (GB)" (the underlined portion in FIG. 18).

In other words, the information processing apparatus 6, by acquiring the state information 632 in accordance with the completion of a task executed in the operation system, is able to acquire the state information 632 efficiently after updating. Therefore, the information processing apparatus 6 is able to restrict the processing load on the manager 1 due to the reception of the state information 632. Description of the other information in FIG. 16 to FIG. 18 is omitted here.

Returning to FIG. 10, the time determination unit 612 of the information processing apparatus 6 refers to the task information 631 acquired in S22, and determines whether or not there is a task which is currently being executed (S25). More specifically, the time determination unit 612 determines whether or not there is a task for which the "state of progress" is not set to "100%". If there is a task matching this condition, then the state information acquisition unit 613 determines that there is a task which is currently being executed.

If, as a result of this, there is a task which is currently being executed (YES at S25), then the time determination unit 612 calculated (predicts) a predicted execution time for the task currently being executed (S26; S1 and S2 in FIG. 8).

FIG. 19 is a concrete example of the task information 631 acquired after FIG. 15. The task information 631 illustrated in FIG. 19, when compared to the task information 631 illustrated in FIG. 15, includes added information having an "ID" of "12" and "13" (the underlined portion in FIG. 19). In the information having an "ID" of "12", the "state of progress" is set to "100%". In other words, the task corresponding to the information having an "ID" of "12" is a task which has started and completed execution after the acquisition of the task information 631 illustrated in FIG. 15 and before the acquisition of the task information 631 illustrated in FIG. 19 (YES at S23; S24).

On the other hand, in the information having an "ID" of "13", the "state of progress" is set to "25%". Moreover, in the information having an "ID" of "13", the "end time" has not been set. Therefore, the task corresponding to the information having an "ID" of "13" is a task which has started execution after the acquisition of the task information 631 illustrated in FIG. 15 and before the acquisition of the task information 631 illustrated in FIG. 19. The task corresponding to the information having an "ID" of "13" is a task that is currently being executed. Consequently, in the example illustrated in FIG. 19, the time determination unit 612 determines that the task corresponding to the information having an "ID" of "13" is currently being executed, and calculates the predicted execution time (YES at S25; S26).

(Concrete Example of Calculation of Predicted Execution Time for Tasks)

Next, a concrete example of a case of calculating a predicted execution time for a task that is currently being executed will be described.

The time determination unit 612 calculates a predicted execution time for the task currently being executed by, for example, determining the average value of the execution time when respective tasks have been executed in the past. More specifically, in the example illustrated in FIG. 19, the information of which the "task type" is "create machine" is the information having an "ID" of "1", "6" and "10". The "start time" of the information having an "ID" of "1" is "2014-01-01 00:00:00", and the "end time" thereof is "2014-01-01 00:10:03". Therefore, the task corresponding to the information having an "ID" of "1" needed 10 minutes and 3 seconds to complete execution. Furthermore, the "start time" of the information having an "ID" of "6" is "2014-01-04 00:02:00", and the "end time" thereof is "2014-01-04 00:12:10". Therefore, the task corresponding to the information having an "ID" of "6" needed 10 minutes and 10 seconds to complete execution (below this time is also called the "needed execution time"). Moreover, the "start time" of the information having an "ID" of "10" is "2014-01-05 10:23:00" and the "end time" thereof is "2014-01-05 10:32:59". Therefore, the task corresponding to the information having an "ID" of "10" needed 9 minutes and 59 seconds to complete execution.

Therefore, the time determination unit 612 sets, for example, 10 minutes and 4 seconds, which is the average of 10 minutes and 3 seconds, 10 minutes and 10 seconds and 9 minutes and 59 seconds, as the predicted execution time for the task of which the "task type" is "create machine". By this, the time determination unit 612 is able to predict that the predicted execution time for the task is 10 minutes and 4 seconds when a task of which "task type" is "create machine" arises.

Returning to FIG. 10, the time determination unit 612 updates the time information 633 on the basis of the predicted execution time calculated in S26 (S27). The time determination unit 612, for example, calculates the value to be set for the "next set value" of the time information 633, from the predicted execution time calculated in S26 and the "state of progress" of the task currently being executed.

More specifically, in the information having an "ID" of "13" in the task information 631 in FIG. 19, a value of "25%" is set as the "state of progress". Furthermore, in the example described above, the predicted execution time of a task of which the "task type" is "create machine" is 10 minutes and 4 seconds. Therefore, in this case, the time determination unit 612 calculates 2 minutes and 31 seconds (151 seconds), which is the result of multiplying "25%" by 10 minutes and 4 seconds (604 seconds), as the time that has elapsed since the time at which the execution of the task having an "ID" of "13" started (also called "execution start time" below). Moreover, the time determination unit 612 calculates 7 minutes and 33 seconds (453 seconds), which is the result of subtracting 2 minutes and 31 seconds (151 seconds) from 10 minutes and 4 seconds (604 seconds), as the amount of time that is further needed until execution of the task having an "ID" of "13" is completed. As illustrated in FIG. 20, the time determination unit 612 sets the "next set value" of the time information 633 to "453".

In other words, in this case, the task information acquisition unit 631 acquires the task information 631 again after 453 seconds has elapsed after the calculating the value to be set for the "next set value" of the time information 633 by the time determination unit 612 (YES at S21; S22).

As illustrated in FIG. 21, the time determination unit 612 may set the sum of the time set as the "start time" of the task being executed, plus the predicted execution time, (this sum is also called the "execution end time" below), as the value for the "next set value" of the time information 633. In this case, the task information acquisition unit 631 acquires the task information 631 again when the current time has reached the time set as the "next set value" of the time information 633 (YES at S21; S22).

More specifically, in the information having an "ID" of "13" in the task information 631 in FIG. 19, the "start time" is set to "2014-01-06 08:57:00". Furthermore, in the example described above, the predicted execution time for the task of which the "task type" is "create machine" is 10 minutes and 4 seconds. Consequently, in this case, the time determination unit 612 calculates the time, 09:07:04 on 6 Jan. 2014, which is 10 minutes and 4 seconds after the time set for the "start time", as the execution completion time. As illustrated in FIG. 21, the time determination unit 612 sets "2014-01-06 09:07:04" as the "next set time" in the time information 633.

On the other hand, if there is no task that is currently being executed, as illustrated in FIG. 10 (NO at S25), then the time determination unit 612 does not calculate the execution end time of the task currently being executed and update the time information 633.

FIG. 22 is a concrete example of the task information 631 that is acquired after FIG. 19. In the task information 631 illustrated in FIG. 22, in comparison with the task information 631 illustrated in FIG. 19, the time "2014-01-06 09:57:04" is set as the "end time" of the information which has an "ID" of "13", and the "state of progress" thereof is set to "100%". In other words, in the task information 631 illustrated in FIG. 22, the task having an "ID" of "13" which was being executed in the task information 631 illustrated in FIG. 19 has completed execution (YES at S23). Therefore, in this case, the state information acquisition unit 613 acquires the state information 632 of the operation system (YES at S22, S23; S24).

In this way, the information processing apparatus 6, by acquiring state information 632 in accordance with the fact that execution of the task running on the operation system has been completed, is able to acquire state information 632 which has a high probability of having been updated from the previously acquired state information 632. Therefore, the information processing apparatus 6 is able to acquire the state information 632 efficiently, while restricting the number of times that acquisition requests for the state information 632 are sent to the manager 1.

(Details of Information Acquisition Process in First Embodiment)

Next, the details of the information acquisition process according to the first embodiment will be described. FIG. 11 is a flowchart illustrating processing in the information processing apparatus 6.

The acquisition request reception unit 614 of the information processing apparatus 6 waits to receive an acquisition request (API) for the state information 632 of the operation system from an operator terminal 5 (NO at S31; NO at S11 in FIG. 9). If an acquisition request for state information 632 has been received (YES at S31, NO at S11 in FIG. 9), then the state information transmission unit 615 of the information processing apparatus 6 sends the state information 632 stored in the information storage region 630 to the operator terminal 5 which sent the acquisition request for state information 632 (S32; S12 in FIG. 9).

In other words, the information processing apparatus 6, upon acquiring the acquisition request for state information 632 of the operation system from the operator terminal 5, does not send this acquisition request to the manager 1, but rather sends the state information 632 acquired previously in S24 of FIG. 10 to the operator terminal 5.

Therefore, even if a large number of operator terminals 5 send acquisition requests for state information 632 to the operation system at periodic intervals, the information processing apparatus 6 does not have to send the received acquisition requests for state information 632 to the manager 1 upon receiving the acquisition requests. Consequently, the information processing apparatus 6 is able to restrict the processing load on the manager 1.

On the other hand, FIG. 12 is a flowchart which illustrates the information acquisition process in the operator terminal 5. The acquisition request transmission unit 511 of the operator terminal 5 waits until the acquisition timing of the state information 632 (NO at S41). The acquisition timing of this state information 632 may be the update frequency of the display contents of the display apparatus (not illustrated) of the operator terminal 5 (for example, every 20 (s)). When the acquisition timing of the state information 632 is reached (YES at S41), the acquisition request transmission unit 511 sends an acquisition request for the state information 632 to the information processing apparatus 6 (S42).

As described above, the information processing apparatus 6 does not send the acquisition request for the state information 632 of the operation system received from the operator terminal 5 to the manager 1. Therefore, the operator terminal 5 is able to send an acquisition request for the state information 632 at the needed timing, without taking account of the load on the manager 1.

Subsequently, the state information reception unit 512 of the operator terminal 5 waits to acquire state information 632 from the information processing apparatus 6 (NO at S43). When the state information 632 has been acquired (YES at S43), the state information reception unit 512 stores the receives state information 632 in the information storage region 530 as state information 531. Accordingly, the operator terminal 5 is able to update the display contents of the display apparatus on the basis of the stored state information 531.

As described above, according to the first embodiment, the information processing apparatus 6 determines the time for acquiring the state information 632 of the operation system, on the basis of the processing status of the tasks being executed by the operation system. At the determined time, the information processing apparatus 6 acquires the state information on the operation system and stores the information in the storage unit 630. Upon subsequently receiving an acquisition request for the state information 632 from the operator terminal 5, the information processing apparatus 6 sends back the state information 632 stored in the storage unit 630.

In other words, when a plurality of operator terminals 5 send an API to the manager 1, each operator terminal 5 is not able to detect the transmission of an API by the other operator terminals 5. Therefore, in order to swiftly acquire the updated state information 632 when there has been an update of the state information 632 due to the transmission of an API by another operator terminal 5, each of the operator terminals 5 is needed to frequently send an API for acquiring the state information 632 to the manager 1. As a result of this, the processing load on the manager 1 increases with the execution of processing in relation to the received APIs.

On the other hand, the information processing apparatus 6 according to the present embodiment receives the APIs from the operator terminals 5, in the place of the manager 1. Moreover, the information processing apparatus 6 sends acquisition requests for the state information 632 to the manager 1 only the minimum needed number of times, on the basis of the task information 631. Therefore, it is possible to restrict increase in the processing load on the manager 1 due to the reception of acquisition requests for state information 632.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing apparatus comprising:
 a first information acquisition processor which repeatedly acquires, from an operation system operating on another information processing apparatus, a processing status for each task executed by the operation system;
 a time determination processor which determines, every time the processing status is acquired from the other information processing apparatus, a time for acquiring state information which includes usage of the hardware of the operation system and of which contents change at an end of a task, from the other information processing apparatus, based on the processing status;
 wherein the processing status of the tasks is information indicating whether or not there is a task that is being executed in the operation system;
 when the processing status of the tasks indicates that there is a task that is being executed, the time determination processor determines, as a time for acquiring the state information, an execution end time which is a time when a predicted execution time for the task being executed has elapsed after an execution start time of the task being executed;
 when there is a first task which has completed execution, among tasks that were being executed in the operation system when the state information was acquired previously, a second information acquisition processor which acquires the state information and stores the state information in a storage, at the determined time; and
 when an acquisition request for the state information is received from a monitoring apparatus used by operator of the operation system, an information reply processor which sends hark the state information stored in the storage to the monitoring apparatus, without acquiring the state information from the other information processing apparatus in order to reduce burden on the other information processing apparatus.

2. The information processing apparatus according to claim 1, wherein the execution prediction time is a time indicating average of execution times when tasks executed in the operation system were executed in the past.

3. The information processing apparatus according to claim 1, wherein the task is a task that the monitoring apparatus has requested to execute to the operation system.

4. The information processing apparatus according to claim 1, wherein the monitoring apparatus periodically sends the acquisition request to the operation system.

5. A non-transitory computer-readable storage medium storing therein a program for causing a computer to execute a process comprising:
 acquiring, from an operation system operating on another information processing apparatus, a processing status for each task executed by the operation system repeatedly;
 determining, every time the processing status is acquired from the other information processing apparatus, a time for acquiring state information which includes usage of the hardware of the operation system and of which contents change at end of a task, from the other information processing apparatus, based on the processing status;
 wherein the processing status of the tasks is information indicating whether or not there is a task that is being executed in the operation system;
 when the processing status of the tasks indicates that there is a task that is being executed, the time determination processor determines, as a time for acquiring the state information, an execution end time which is a time when a predicted execution time for the task being executed has elapsed after an execution start time of the task being executed;
 when there is a first task which has completed execution, among tasks that were being executed in the operation system when the state information was acquired previously, acquiring the state information and storing the state information in a storage, at the determined time; and
 when an acquisition request for the state information is received from a monitoring apparatus used by operator of the operation system, sending back the state information stored in the storage to the monitoring apparatus, without acquiring the state information from the other information processing apparatus in order to reduce burden on the other information processing apparatus.

6. An information processing system comprising:

an information processing apparatus; and a monitoring apparatus capable of communicating with the information processing apparatus, the information processing apparatus repeatedly acquires, from an operation system operating on another information processing apparatus, a processing status for each task executed by the operation system;

the information processing apparatus determines, every time the processing status is acquired from the other information processing apparatus, a time for acquiring state information which includes usage of the hardware of the operation system and of which contents change at end of a task, from the other information processing apparatus, based on the processing status;

wherein the processing status of the tasks is information indicating whether or not there is a task that is being executed in the operation system;

when the processing status of the tasks indicates that there is a task that is being executed, the time determination processor determines, as a time for acquiring the state information, an execution end time which is a time when a predicted execution time for the task being executed has elapsed after an execution start time of the task being executed;

when there is a first task which has completed execution, among tasks that were being executed in the operation system when the state information was acquired previously, the information processing apparatus acquires the state information and stores the state information in a storage, at the determined time;

the monitoring apparatus used by operator of the operation system sends to the information processing apparatus an acquisition request for the state information; and when the acquisition request is received from the monitoring apparatus, the information processing apparatus sends back the state information stored in the storage to the monitoring apparatus, without acquiring the state information from the other information processing apparatus in order to reduce burden on the other information processing apparatus.

* * * * *